US008914952B2

(12) United States Patent
Wakabayashi

(10) Patent No.: US 8,914,952 B2
(45) Date of Patent: Dec. 23, 2014

(54) CLIP

(75) Inventor: Yasuki Wakabayashi, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 59 days.

(21) Appl. No.: 13/064,898

(22) Filed: Apr. 25, 2011

(65) Prior Publication Data

US 2011/0265295 A1 Nov. 3, 2011

(30) Foreign Application Priority Data

Apr. 30, 2010 (JP) ................ P.2010-105194

(51) Int. Cl.
*F16B 2/20* (2006.01)
*F16B 37/08* (2006.01)

(52) U.S. Cl.
CPC ................ *F16B 37/0842* (2013.01)
USPC ............ 24/457; 248/68.1; 248/74.1

(58) Field of Classification Search
USPC ........... 24/16 PB, 289–297, 457; 248/74.3, 248/74.1, 68.1, 635, 909
See application file for complete search history.

(56) References Cited

U.S. PATENT DOCUMENTS

| | | | | |
|---|---|---|---|---|
| 2,644,213 A * | 7/1953 | Bedford, Jr. | ............ | 24/295 |
| 3,462,802 A * | 8/1969 | Merser | ............ | 24/16 PB |
| 3,954,295 A * | 5/1976 | Harley | ............ | 292/319 |
| 4,570,303 A * | 2/1986 | Richmond et al. | ............ | 24/16 PB |
| 4,588,218 A * | 5/1986 | Guiler et al. | ............ | 292/307 R |
| 4,614,373 A * | 9/1986 | Niemeijer | ............ | 292/318 |
| 4,850,773 A * | 7/1989 | Asami | ............ | 411/173 |
| 5,154,376 A * | 10/1992 | Baum et al. | ............ | 248/74.3 |
| 5,568,952 A * | 10/1996 | Ruegg | ............ | 292/318 |
| 5,598,994 A * | 2/1997 | Olewinski et al. | ............ | 248/73 |
| 5,926,921 A * | 7/1999 | Benoit | ............ | 24/16 PB |
| 6,174,006 B1 * | 1/2001 | Burt | ............ | 292/307 A |
| 6,206,330 B1 * | 3/2001 | Oi et al. | ............ | 248/68.1 |
| 6,320,134 B1 * | 11/2001 | Rehberg et al. | ............ | 174/135 |
| 6,708,931 B2 * | 3/2004 | Miura | ............ | 248/68.1 |
| 6,981,725 B2 * | 1/2006 | Debrody et al. | ............ | 292/307 R |
| 7,143,485 B2 * | 12/2006 | Kanie | ............ | 24/453 |

(Continued)

FOREIGN PATENT DOCUMENTS

DE 19929016 A1 12/2000
JP S57-052038 A 3/1982

(Continued)

OTHER PUBLICATIONS

Japanese Notification of Reasons for Refusal dated Aug. 27, 2013, with English-language translation.

(Continued)

*Primary Examiner* — Robert J Sandy
*Assistant Examiner* — Rowland Do
(74) *Attorney, Agent, or Firm* — McGinn IP Law Group, PLLC

(57) ABSTRACT

A clip includes a cylindrical body having insertion space into which one of different diameters of rod members is insertable, a pair of locking claws formed to face each other in a first direction and configured to lock the rod member inserted into the insertion space, and an inner wall configured to be deformable in a second direction which is substantially at right angles to the first direction. The inner wall deforms in the second direction upon receiving a rod member having a largest diameter among all of the attaching target rod members.

18 Claims, 6 Drawing Sheets

(56) References Cited

U.S. PATENT DOCUMENTS

| | | |
|---|---|---|
| 7,740,210 B2 * | 6/2010 | Pilon et al. .................... 248/74.3 |
| 2002/0003993 A1 * | 1/2002 | Ichimaru ........................ 411/325 |
| 2004/0140406 A1 * | 7/2004 | Kanie ............................. 248/73 |
| 2010/0199464 A1 * | 8/2010 | Sano ............................... 24/289 |

FOREIGN PATENT DOCUMENTS

| | | | |
|---|---|---|---|
| JP | H10-037933 A | | 2/1998 |
| JP | H10-252719 A | | 9/1998 |
| JP | 2000-179523 A | | 6/2000 |
| JP | 2002-005337 A | | 1/2002 |
| JP | 2009-303412 A | | 12/2009 |

OTHER PUBLICATIONS

Japanese Notification of Reasons for Refusal dated Nov. 26, 2013, with English-language translation.

* cited by examiner

US 8,914,952 B2

CLIP

CROSS-REFERENCE TO RELATED APPLICATION(S)

This application claims priorities from Japanese Patent Application No. 2010-105194 filed on Apr. 30, 2010, the entire contents of which are incorporated herein by reference.

FIELD

The present invention relates to a clip attachable to different diameters of rod members such as bolts.

BACKGROUND

For example, in an automobile, a clip capable of being fixed to a projecting bolt while fastening a wiring harness is used. Generally, different types of such clips are provided respectively for different diameters of bolts. However, in view of manufacturing cost, it is more preferable to design such clip to be attachable to the different diameters of bolts.

For example, JP-2000-179523-A discloses a bolt clamp attachable to different diameters of bolts. The bolt clamp in JP-2000-179523-A has a cylindrical body. Inside the cylindrical body, two side walls are provided to face each other. And, between the side walls, two locking claws are elastically supported through flexible arms to face each other. These components are integrally molded.

In JP-2000-179523-A, the size between the side walls is set correspondingly with a largest applicable diameter. Therefore, when the clip is attached to a bolt having a smallest applicable diameter, the wobbling of the cylindrical body with respect to the bolt may be caused. In particular, in an automobile which generates vibrations, the bolt clamp may wobble together with the wiring harness fastened thereto, and the wiring harness may be worn by being brought into contact with surrounding parts.

SUMMARY

One object of the present invention is to provide a clip attachable to different diameters of rod members such as bolts while preventing wobbling in the attached state.

According to an aspect of the present invention, there is provided a clip, including: a cylindrical body having insertion space into which one of different diameters of rod members is insertable; a pair of locking claws formed to face each other in a first direction and configured to lock the rod member inserted into the insertion space; and an inner wall configured to be deformable in a second direction which is substantially at right angles to the first direction, wherein the inner wall deforms in the second direction upon receiving a rod member having a largest diameter among all of the attaching target rod members.

According to the above structure, the clip can be attached to different diameters of rod members, and in the attached state, the wobbling of the clip with respect to the rod member can be restrained. Further, the inner wall is formed to be elastically deformable, and defines a predetermined width without an external force. The inner wall not only supports the rod member having a diameter larger than the predetermined width by being deflected, but also limits a movement of the rod member having a diameter smaller than the predetermined width within the range of the predetermined width. Therefore, even if the clip is attached to the rod member having the smallest applicable diameter among all of the attaching target rod members, the wobbling of the clip can be reduced.

DETAILED DESCRIPTION

Figure 1:
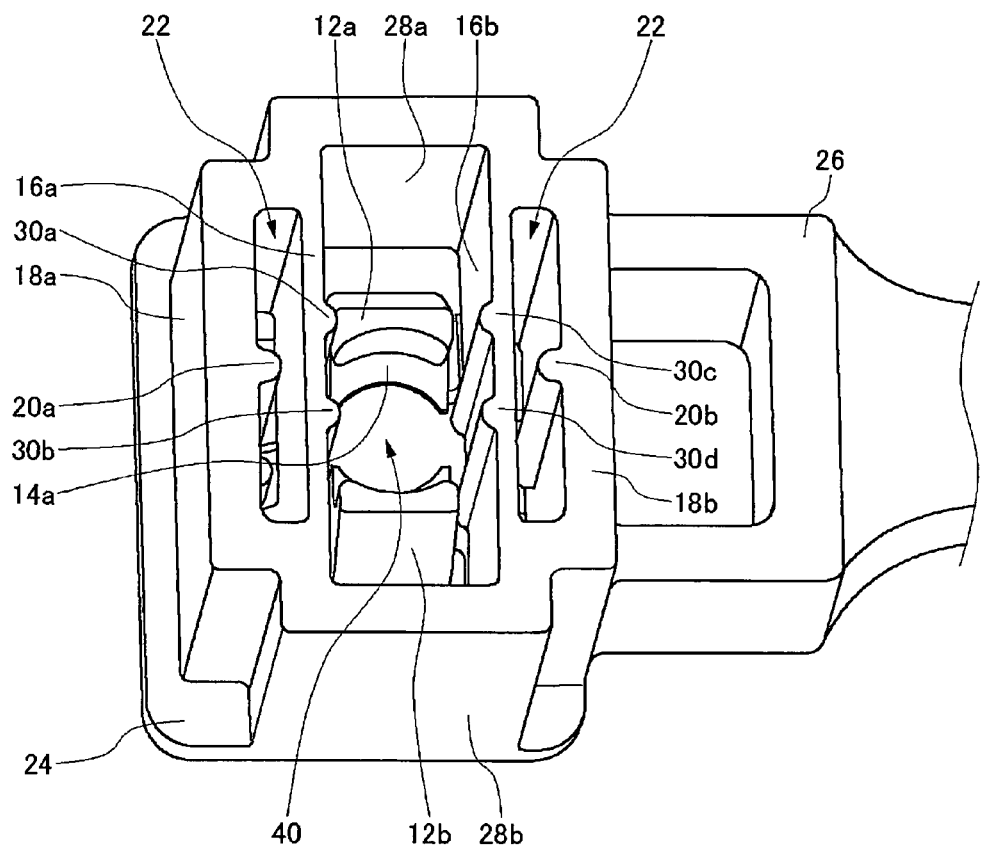
FIG. 1 illustrates an upper surface side of a clip according to an embodiment.
Figure 2:
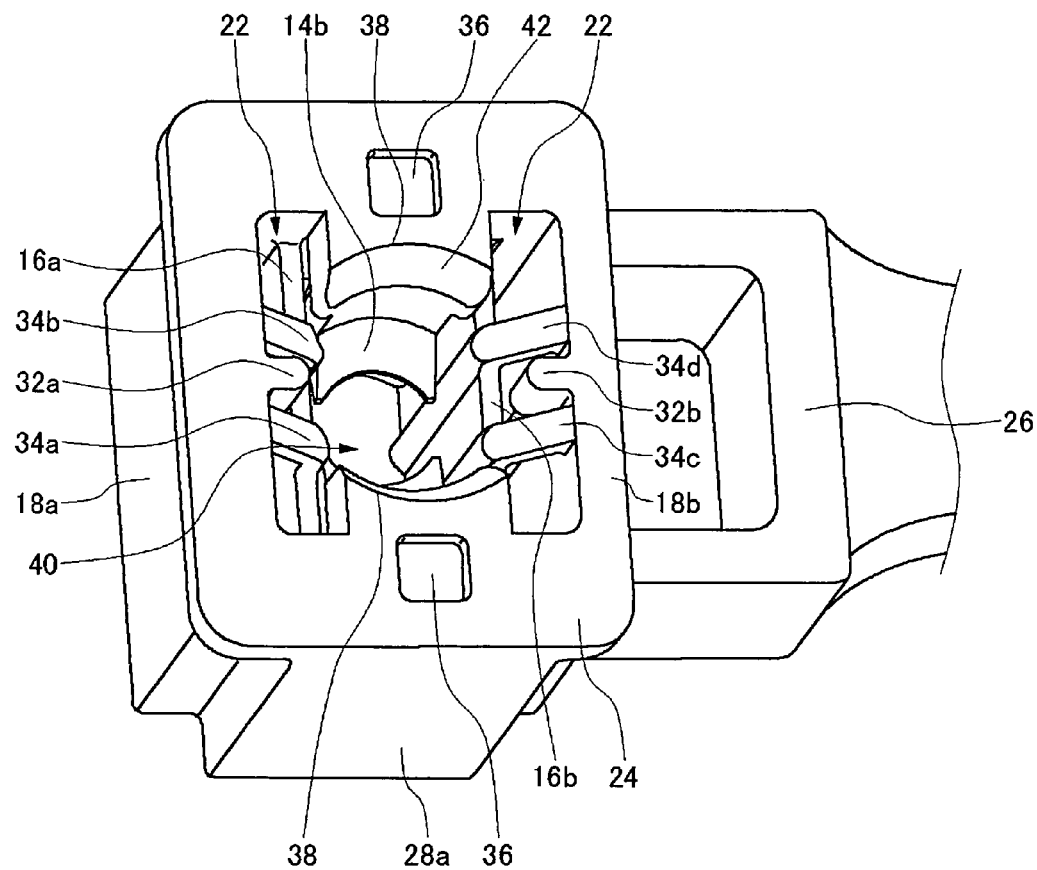
FIG. 2 illustrates a lower surface side of the clip.
Figure 3:
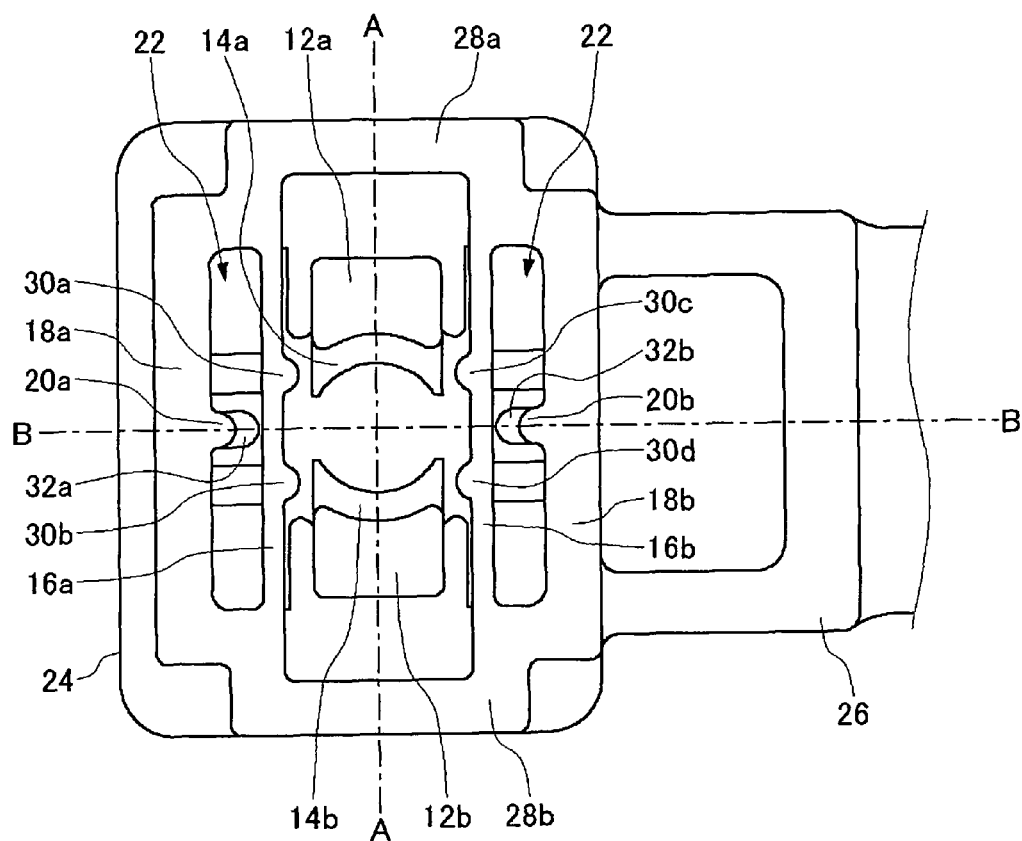
FIG. 3 illustrates a plan view of the clip.
Figure 4:
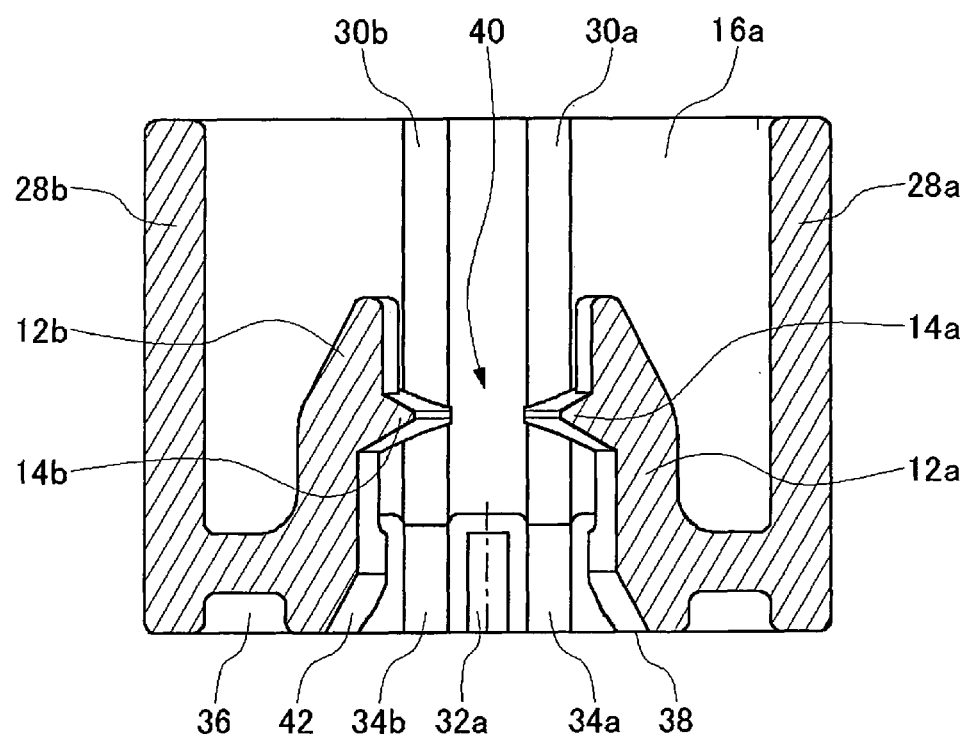
FIG. 4 cross-sectionally illustrates the clip.
Figure 5:
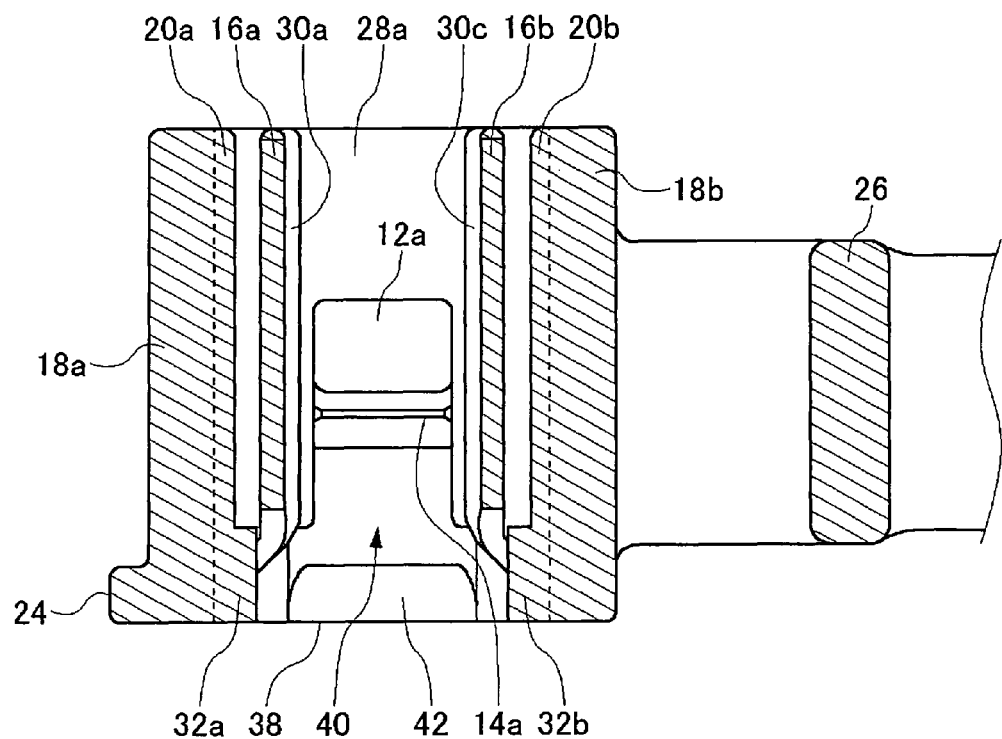
FIG. 5 cross-sectionally illustrates the clip.

FIG. 1 illustrates an upper surface side of a clip 10 according to an embodiment. FIG. 2 illustrates a lower surface side of the clip 10. FIG. 3 illustrates a plan view of the clip 10. Further, FIGS. 4 and 5 are sectional views of the clip 10. FIG. 4 is taken along the line A-A in FIG. 3, and FIG. 5 is taken along the line B-B in FIG. 3.

For example, the clip 10 has a fastening band (not shown) to fasten a wiring harness of an automobile, and the clip 10 is attached to a stud-type bolt which projects from a member such as a body panel while fastening such wiring harness. The clip 10 has a cylindrical body which is integrally resin molded so as to be attached to different diameters of bolts.

The clip 10 has a base plate portion 24. A pair of side walls 28a, 28b (also referred to as "side walls 28", collectively) are erected from the base plate portion 24 so as to be in parallel to face each other. Also, a pair of outer walls 18a, 18b (also referred to as "outer walls 18", collectively) are erected from the base plate portion 24 so as to be in parallel to face each other. The side wall 28a and the side wall 28b face each other in a first direction, and the outer wall 18a and the outer wall 18b face each other in a second direction which is substantially at right angles to the first direction. The side walls 28 and the outer walls 18 are connected to each other at end portions and are disposed so as to surround an insertion space 40 into which a bolt is inserted. An insertion aperture 38 is formed in a center of a lower surface of the base plate portion 24. The insertion space 40A extends upwards from the insertion aperture 38 to thereby receive a bolt. In addition, mold release holes 36 are formed in the lower surface of the base plate portion 24. A buckle 26 is provided on an outside of the outer wall 18b. For example, the buckle 26 functions as a fastening tool for locking a fastening band. Note that a different type of fastening tool other than the buckle 26 may be attached to the outer wall 18.

A pair of flexible arms 12a, 12b (also referred to as "flexible arms 12", collectively) are provided on the base plate portion 24 so as to be erected therefrom to face each other in the first direction between the pair of side walls 28. As viewed from above, facing surfaces of the flexible arm 12a and the flexible arm 12b are each formed into an arc shape so as to match the shape of a bolt to be inserted therebetween. As shown in FIG. 4, a thickness of the flexible arm 12 in the first direction is made thinner at an upper end portion than at a lower end portion, whereby the flexible arm 12 is deflectable in the first direction.

A pair of locking claw 14a, 14b (also referred to as "locking claws 14", collectively) are erected from the pair of flexible arms 12a, 12b, respectively, and the locking claws 14 are disposed so as to face each other in the first direction as with the flexible arms 12. Facing surfaces of the locking claw 14a and the locking claw 14b are each formed into an arc shape so as to match the shape of a bolt, and are formed thin so as to fit in a thread portion in the bolt, thereby locking the bolt inserted into the insertion space 40. Specifically, when the bolt is inserted in the insertion space 40, the pair of flexible arms 12 are moved away from each other in the first direction while biasing the pair of corresponding locking claws 14 towards the bolt, whereby the pair of locking claws 14 fit in the thread portion of the bolt and the bolt is held therebetween. Thus, when the clip 10 is attached to a bolt, the wobbling of the clip in the first direction with respect to the bolt is restrained by the flexible arms 12 and the locking claws 14.

An inner wall 16a and an inner wall 16b (also, referred to as "inner walls 16", collectively) are disposed inside the outer walls 18 in parallel. The inner walls 16 face the outer walls 18, respectively. The inner walls 16 are formed thin so as to be elastically deformable in the second direction. Inter-wall cavities 22 are formed between the inner walls 16 and the outer walls 18.

A distance between the inner wall 16a and the inner wall 16b is determined in accordance with diameters of bolts as the attaching target to which the clip is designed to be attached. For example, a distance between the inner wall 16a and the inner wall 16b is determined to be narrower than a largest applicable diameter of the attaching target bolts, and to be equal to or larger than a smallest applicable diameter of the attaching target bolts, when no force is applied to the inner walls 16a, 16b. According to this configuration, when the bolt having the largest applicable diameter is inserted, the inner walls 16 are elastically deformed to expand the distance therebetween in the second direction. The distance between the inner wall 16a and the inner wall 16b may be set to be narrower than the smallest applicable diameter.

By setting the distance between the inner wall 16a and the inner wall 16b to be the same as the smallest applicable diameter of the attaching target bolts, when the bolt having the smallest applicable diameter is attached, the inner walls 16 are brought into contact with the bolt. Namely, the inner walls 16 support the inserted bolt to restrain the wobbling in the second direction. Further, since the inner walls 16 support the bolt through line contact rather than point contact, the bolt is stably supported. Further, the bolt is supported in the first direction by the flexible arms 12 (the locking claws 14) and in the second direction by the inner walls 16, that is, the bolt is supported from the four directions.

As shown in FIGS. 2 and 4, inclined portions 42 are formed on the base plate portion 24 below the flexible arms 12 to thereby facilitate the insertion of a bolt. As shown in FIG. 5, the inner walls 16 are not formed in positions corresponding to the lower surface of the base plate portion 24 so as not to interrupt the insertion of the bolt. As shown in FIG. 2, a guide portion 34a, a guide portion 34b, a guide portion 34c and a guide portion 34d (also referred to as "guide portions 34", collectively) are formed to extend upwards from the lower surface of the base plate portion 24, thereby upwardly guiding the bolt into the insertion space 40. In this embodiment, the guide portions 34 connect the base plate portion 24 with the inner walls 16. According to the above configuration, since lower ends of the inner walls 16 is supported by the guide portions 34, the inner walls 16 are reinforced and the holding force of the inner walls 16 can be increased, whereby the wobbling of the inserted bolt in the second direction can be restrained. In addition, when inserting a bolt, the bolt is prevented from being brought into contact with the lower ends of the inner walls 16. Thus, the guide portions 34 contribute smooth insertion of the bolt into the insertion space 40.

A first protruding portion 20a is provided on an inner side of the outer wall 18a, and a first protruding portion 20b is provided on an inner side of the outer wall 18b. As viewed from above, the first protruding portion 20a and the first protruding portion 20b (also referred to as "first protruding portions 20", collectively) protrude in the second direction towards an axis of the insertion space 40. Here, the axis of the insertion space 40 substantially coincides with an axis of the bolt. Thus, in the following description, they may be simply referred to as the "axis". The first protruding portions 20 may be convex-shaped ribs which are formed in parallel to the axis. The first protruding portions 20 function to stop the excessive outward deformation of the inner walls 16 in the second direction. Thus, an excessive wobbling of the clip 10 in the second direction with respect to the bolt can be restrained, thereby preventing the fitting engagement between the locking claws 14 and the thread portion of the bolt from being released.

As shown in FIGS. 2 and 5, a second protruding portion 32a and a second protruding portion 32b (also referred to as "second protruding portions 32", collectively) are provided on the inner sides of the outer walls 18. The second protruding portions 32 are provided at a side of the insertion aperture 38, and are continuous with the respective first protruding portions 20. Upper ends of the second protruding portions 32 are situated further downwards than the lower ends of the inner walls 16. The second protruding portions 32 may be convex-shaped ribs which are formed in parallel to the axis.

As viewed from above, the second protruding portions 32 protrude in the second direction towards the axis of the inserted bolt (the axis of the insertion space 40) further inwards than the respective first protruding portions 20. According to this configuration, the wobbling of the clip 10 in the second direction at a root of the inserted bolt can be restrained. When the clip 10 is attached to the bolt and the bolt is locked by the locking claws 14, the clip 10 wobbles with respect to the bolt about the locking portion as a fulcrum. Thus, it is effective to restrain the clip 10 from wobbling at the root of the bolt.

As shown in FIGS. 1 and 3, a contact portion 30a and a contact portion 30b are provided on an inner side of the inner wall 16a in parallel to the axis, and a contact portion 30c and a contact portion 30d are provided on an inner side of the inner wall 16b in parallel to the axis. The contact portion 30a, the contact portion 30b, the contact portion 30c and the contact portion 30d are also referred to as "contact portions 30", collectively. The contact portions 30 may be convex-shaped ribs which extend in parallel to the axis. The four contact portions 30 are disposed so as to surround the inserted bolt. The contact portion 30a and the contact portion 30b are disposed in a line symmetric fashion with respect to a straight line which passes through the axis in the second direction. A distance between the contact portion 30a and the contact portion 30b is determined so as to be shorter than the smallest applicable diameter of the attaching target bolt. The contact portions 30c, 30d are disposed in the same way as the contact portions 30a, 30b. The contact portions 30 are brought into contact with the bolt inserted in the insertion space 40. By providing the contact portions 30 so as to extend in parallel to the axis, the inserted bolt can be supported through line contact, whereby the wobbling of the clip 10 in the first direction with respect to the bolt can be restrained. In addition, since the contact portions 30 are provided on the elastically-deformable inner walls 16, the contact portions 30 can support different diameters of bolts in the same way.

As shown in FIG. 2, the guide portions 34 are continuous with the contact portions 30. Thus, when the bolt is inserted into the insertion space 40, the bolt can smoothly be inserted to an upper portion in the insertion space 40 so that the axis of the bolt substantially coincides with the axis of the insertion space 40. The second protruding portions 32 are provided between the guide portions 34.

Figure 6A:
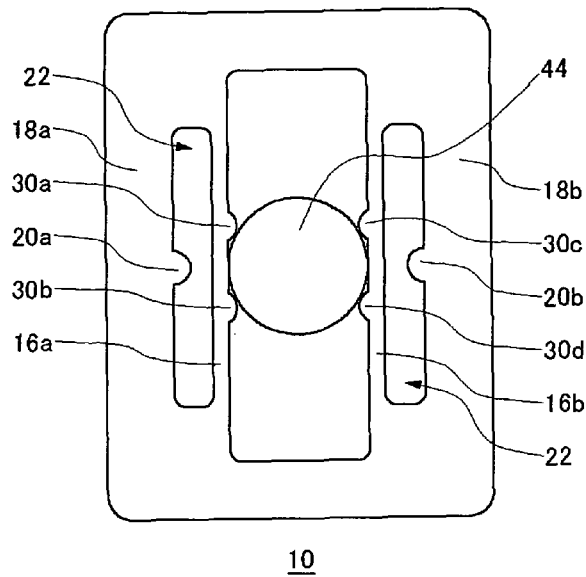
FIGS. 6A and 6B illustrate the function of the clip.
Figure 6B:
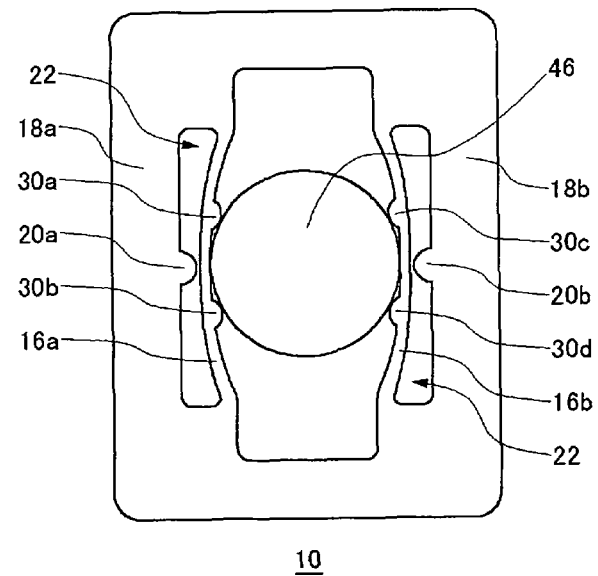

FIGS. 6A and 6B illustrate the function of the inner walls 16 of the clip 10 according to the embodiment. FIG. 6A shows a plan view when a bolt 44 having a smallest applicable diameter among bolts to which the clip 10 is designed to be attached is inserted therein, and FIG. 6B shows a plan view when a bolt 46 having a largest applicable diameter among the bolts to which the clip 10 is designed to be attached is inserted into the clip 10. The locking claws 14 for locking the bolt are omitted from illustration.

In FIG. 6A, the distance between the inner wall 16a and the inner wall 16b is set to be the same as the smallest applicable diameter, whereby the inner walls 16 are in contact with the bolt 44. Consequently, even with the bolt having the smallest applicable diameter, the inner walls 16 can support the bolt 44 from the second direction. In addition, the contact portions 30 are in contact with the bolt 44, whereby the wobbling of the clip 10 in the first direction with respect to the bolt 44 can be restrained.

In FIG. 6B, while the inner walls 16 are largely elastically deformed in the second direction by the bolt 46 having the largest applicable diameter, the bolt 46 can also be supported in the first direction by the elastically-deflectable flexible arms 12 and the locking claws 14, whereby the bolt 46 can be supported in the first direction and the second direction within the clip 10. Therefore, the clip 10 can be properly attached to different diameters of bolts. In order to allow the first protruding portions 20 to function as stoppers against an excessive wobbling with respect to the inserted bolt, it is designed such that gaps are provided between the inner walls 16 and the first protruding portions 20 even when the bolt having the largest applicable diameter is inserted.

While the bolts are exemplified as the attaching target objects of the clip, the embodiment is applicable to any rod members having a circumferential groove or a thread portion therein so as to be locked by the locking claws 14.

The invention is not limited to the embodiment, and various modifications such as design changes can be made to the embodiment based on the knowledge of those skilled in the art, and the scope of the invention includes such modified embodiments.

While it is exemplified that the first protruding portions 20 are provided on the outer walls 18 so as to protrude inwards, the first protruding portions 20 may be provided on the inner walls 16 so as to protrude outwards. While it is exemplified that the first protruding portions 20 and the contact portions 30 are continuous in the axial direction, the first protruding portions 20 and the contact portions 30 may be provided partially or intermittently along the axial direction. While the convex-shaped first protruding portions 20 are exemplified in FIG. 1, the outer walls 18 themselves may be formed to swell inwards. In this case, portions swelled inwards from the outer walls may be referred to as first protruding portions 20.

While it is exemplified that the inner walls 16 are provided so as to face each other, only one inner wall may be provided such that one of the inter-wall cavities 22 is filled so as to form a concrete wall. In this case, manufacturing of the clip is facilitated.

The invention claimed is:

1. A clip, comprising:
a body having an insertion space into which one of different diameters of rod members is insertable;
a pair of locking claws connected to the body, formed so as to face each other in a first direction, and configured so as to lock the rod member inserted into the insertion space;
inner walls connected to the body such that the pair of locking claws are formed between the inner walls, and being formed so as to face each other in a second direction, and configured to be deformable in the second direction which is substantially at right angles to the first direction; and
outer walls provided outwardly of the inner walls so as to form a boundary of the insertion space,
wherein the inner wall deforms in the second direction upon receiving a rod member having a largest diameter among all of the attaching target rod members,
wherein a distance between the pair of locking claws in the first direction is less than a distance between the inner walls in the second direction, and
wherein the inner walls extend in a rod member inserting direction perpendicular to the first and second directions, and the pair of locking claws are disposed between both ends of the inner walls in the rod member inserting direction when viewed from the second direction.

2. The clip of claim 1, further comprising:
a contact portion provided on an inner side of the inner wall so as to be brought into contact with the rod member inserted into the insertion space.

3. The clip of claim 1, further comprising:
a guide portion provided on a side of an insertion aperture configured so as to allow insertion of the rod member, so as to be continuous with the inner wall.

4. The clip of claim 1, wherein the inner wall is formed to be brought into contact with a rod member having a smallest diameter among all of the attaching target rod members when it is attached.

5. The clip of claim 1, wherein the pair of locking claws are disposed on opposite sides of the insertion space so as to face each other.

6. The clip of claim 1, wherein the inner walls are disposed on opposite sides of the insertion space so as to face each other.

7. The clip of claim 1, further comprising:
a pair of contact portions provided on an inner side of the inner wall so as to be brought into contact with the rod member inserted into the insertion space.

8. The clip of claim 7, wherein the inner wall between the pair of contact portions extends substantially parallel to a plane extending perpendicular to the second direction.

9. The clip of claim 1, wherein, as viewed from a direction perpendicular to both the first direction and the second direction, the pair of locking claws comprise an arc shape having a center which is disposed on a side of the arc facing the insertion space.

10. The clip of claim 1, wherein the inner walls extend substantially parallel to each other.

11. The clip of claim 1, further comprising a buckle disposed on an outside of the outer wall.

12. The clip of claim 1, wherein the outer walls are disposed outwardly, in the second direction, of the inner walls.

13. The clip of claim 1, further comprising side walls disposed so as to face each other in the first direction, and
wherein the outer walls and the side walls surround the insertion space.

14. A clip, comprising:
a body having an insertion space into which one of different diameters of rod members is insertable;
a pair of locking claws connected to the body, formed so as to face each other in a first direction, and configured so as to lock the rod member inserted into the insertion space;

inner walls connected to the body, formed so as to face each other in a second direction, and configured to be deformable in the second direction which is substantially at right angles to the first direction;
an outer wall provided outwardly of an inner wall of the inner walls; and
a first protruding portion formed on the outer wall so as to protrude in the second direction towards an axis of the rod member inserted into the insertion space,
wherein the inner wall deforms in the second direction upon receiving a rod member having a largest diameter among all of the attaching target rod members, and
wherein a distance between the pair of locking claws in the first direction is less than a distance between the inner walls in the second direction.

15. The clip of claim 14, further comprising:
a second protruding portion which is provided at a side of an insertion aperture configured so as to allow insertion of the rod member, which protrudes in the second direction towards the axis of the rod member inserted into the insertion space and which protrudes more largely than the first protruding portion.

16. The clip of claim 15, wherein the second protruding portion is continuous with the first protruding portion.

17. The clip of claim 14, wherein the outer wall extends substantially parallel to the inner wall.

18. A clip, comprising:
a body having an insertion space into which one of different diameters of rod members is insertable;
a pair of locking claws connected to the body, formed so as to face each other in a first direction, and configured so as to lock the rod member inserted into the insertion space;
inner walls connected to the body, formed so as to face each other in a second direction, and configured to be deformable in the second direction which is substantially at right angles to the first direction;
an outer wall provided outwardly of an inner wall of the inner walls so as to form a boundary of the insertion space; and
a guide portion formed in the insertion space at a side from which the rod member is inserted, the guide portion being connected to the inner and outer walls, and being tapered from a side of the outer wall toward the inner wall along a direction of inserting the rod member,
wherein the inner wall deforms in the second direction upon receiving a rod member having a largest diameter among all of the attaching target rod members.

* * * * *